US012568030B2

(12) United States Patent
Usuba et al.

(10) Patent No.: US 12,568,030 B2
(45) Date of Patent: Mar. 3, 2026

(54) LOCAL 5G MONITORING SYSTEM AND STATE DISPLAY METHOD THEREOF

(71) Applicant: ANRITSU CORPORATION, Kanagawa (JP)

(72) Inventors: Mitsuhiro Usuba, Kanagawa (JP); Atsushi Furuki, Kanagawa (JP); Yoshihiro Fukagawa, Kanagawa (JP); Satoshi Sasaki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 452 days.

(21) Appl. No.: 18/068,893

(22) Filed: Dec. 20, 2022

(65) Prior Publication Data

US 2023/0291666 A1 Sep. 14, 2023

(30) Foreign Application Priority Data

Mar. 9, 2022 (JP) ................................. 2022-036361

(51) Int. Cl.
*H04L 43/045* (2022.01)
(52) U.S. Cl.
CPC ................................. *H04L 43/045* (2013.01)
(58) Field of Classification Search
CPC ............................ H04L 43/045; H04W 24/08
See application file for complete search history.

(56) References Cited

U.S. PATENT DOCUMENTS

| | | | | |
|---|---|---|---|---|
| 11,206,555 | B2 * | 12/2021 | Wang | H04W 16/22 |
| 12,167,479 | B2 * | 12/2024 | Selea | H04W 76/14 |
| 2019/0044632 | A1 * | 2/2019 | Yoon | H04B 17/27 |
| 2020/0022006 | A1 * | 1/2020 | Froehlich | H04W 24/08 |
| 2020/0127907 | A1 * | 4/2020 | Koo | H04W 24/02 |
| 2020/0195359 | A1 * | 6/2020 | Singh | H04L 1/0032 |
| 2020/0404523 | A1 * | 12/2020 | Yoon | H04B 17/318 |
| 2021/0360456 | A1 * | 11/2021 | Ratnam | H04B 17/318 |
| 2021/0391934 | A1 * | 12/2021 | Kim | H04W 24/04 |
| 2022/0159347 | A1 * | 5/2022 | Froehlich | H04N 21/64738 |
| 2022/0256519 | A1 * | 8/2022 | Jeon | G01S 7/0235 |
| 2023/0063998 | A1 * | 3/2023 | Cili | H04W 64/006 |
| 2023/0262511 | A1 * | 8/2023 | Ueno | G05D 1/0285 |
| | | | | 370/329 |

FOREIGN PATENT DOCUMENTS

JP 2019-033355 A 2/2019

* cited by examiner

*Primary Examiner* — Schquita D Goodwin
(74) *Attorney, Agent, or Firm* — McDonald Hopkins LLC

(57) ABSTRACT

The local 5G monitoring system includes measuring devices that measure radio waves from a base station of the local 5G system, and a server device that belongs to the same local area network (LAN) as the measuring devices, or is connected to the Internet, and collects measurement data from the measuring devices, in which the server device generates, based on the measurement data measured by the measuring devices at predetermined time intervals, a heat map showing a distribution of states of the measurement data, and displays the heat map at a time designated by a user, from the generated heat map.

4 Claims, 5 Drawing Sheets

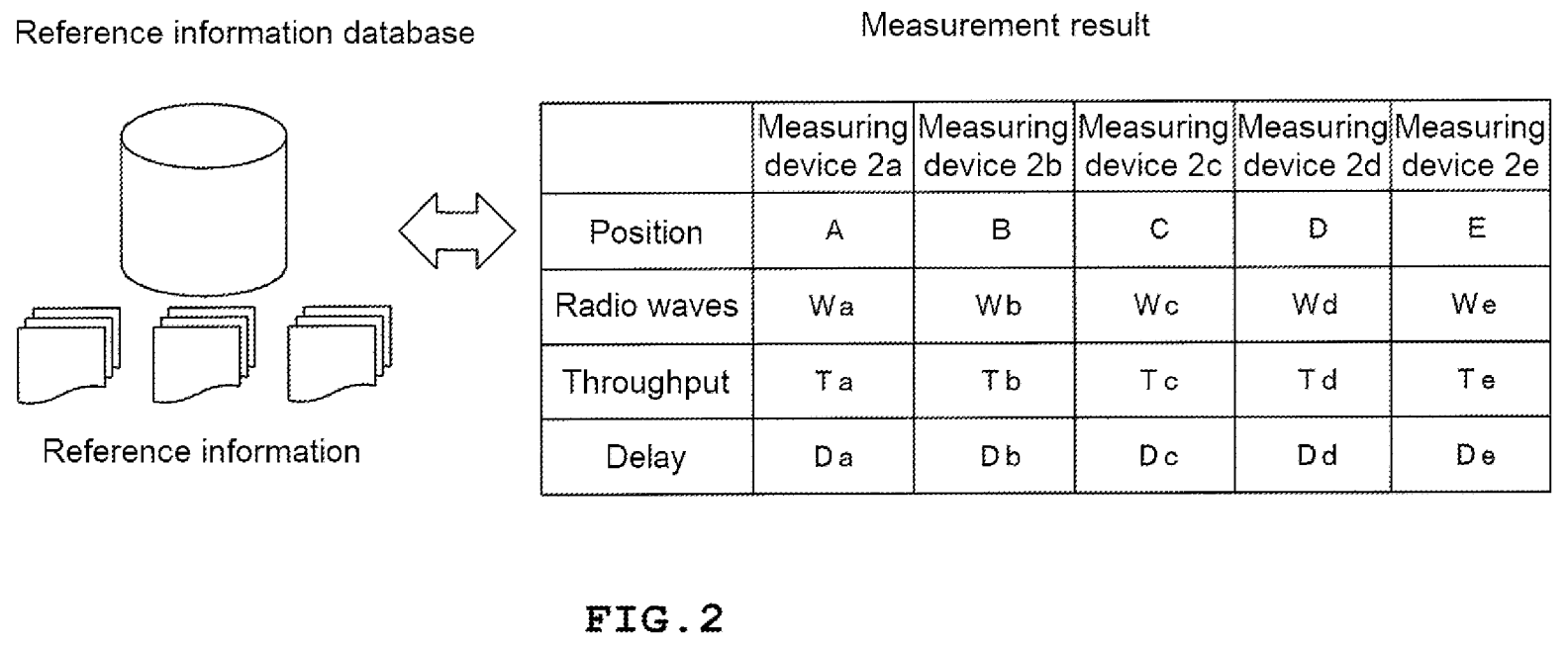

Measurement result

| | Measuring device 2a | Measuring device 2b | Measuring device 2c | Measuring device 2d | Measuring device 2e |
|---|---|---|---|---|---|
| Position | A | B | C | D | E |
| Radio waves | Wa | Wb | Wc | Wd | We |
| Throughput | Ta | Tb | Tc | Td | Te |
| Delay | Da | Db | Dc | Dd | De |

Reference information database

Reference information

FIG.2

LOCAL 5G MONITORING SYSTEM AND STATE DISPLAY METHOD THEREOF

TECHNICAL FIELD

The present invention relates to a local 5G monitoring system for monitoring the operational performance of a local 5G system.

BACKGROUND ART

Local 5G systems have been provided in which by using the various techniques used in the fifth generation mobile communication system (hereinafter also referred to as "5G"), organizations (local governments, companies, or the like) that are not telecommunications carriers have facilities and uses the facilities for exclusively providing services on land it owns or as self-employed communication facilities. Note that the local 5G system is sometimes called a private 5G system.

After such a local 5G system is installed in the user's actual field, in subsequent operations, abnormal states such as a decrease in a transmission speed or communication delay may occur due to factors such as equipment failure or stoppage and radio interference.

Unlike a network configuration using a relatively inexpensive wireless local area network (LAN), the local 5G system is an expensive system that emphasizes large capacity and low delay, and a time when abnormal states such as a decrease in a transmission speed or communication delay occur needs to be kept extremely short.

Patent Document 1 describes a radio quality management system including a control device that wirelessly communicates with a plurality of devices and acquires radio quality, and a terminal device that generates a list in which location information is associated with the radio quality acquired from the control device, for each of the plurality of devices, and displays a radio quality screen, based on the list.

On the radio quality screen of the terminal device, a different color is assigned to each any graded stage of radio quality, and a radio quality distribution is displayed with a color corresponding to the radio quality at each point on the same plane.

RELATED ART DOCUMENT

Patent Document

[Patent Document 1] JP-A-2019-33355

DISCLOSURE OF THE INVENTION

Problem that the Invention is to Solve

However, when analyzing abnormal states such as a decrease in the transmission speed of the local 5G system and communication delays, the conventional radio quality distribution only displays the current radio quality distribution, so past progress and trends cannot be understood, it was sometimes difficult to specify the cause of the abnormal state.

Further, when the radio wave intensity of the local 5G system is strong, the throughput is generally high, but depending on the environment, there may be a case where the radio wave intensity is strong but the throughput is not obtained due to unknown jamming waves, and a case where it is difficult to specify the cause.

Therefore, an object of the present invention is to provide a local 5G monitoring system capable of checking the past state of the local 5G system and easily specifying the cause of an abnormal state.

Means for Solving the Problem

A local 5G monitoring system according to the present invention is a local 5G monitoring system that monitors a local 5G system, including: a measuring device that measures radio waves from a base station of the local 5G system; and a server device that belongs to the same local area network (LAN) as the measuring device, or is connected to the Internet, and collects measurement data from the measuring device, in which the server device generates, based on the measurement data measured by the measuring device at predetermined time intervals, a heat map showing a distribution of states of the measurement data with colors corresponding to the states of the measurement data at respective points on the same plane, and displays the heat map at a time designated by a user, from the generated heat map.

With this configuration, a heat map is generated at predetermined time intervals, and the heat map at the time designated by the user is displayed. Therefore, since the heat map can be displayed retroactively, it is possible to easily specify the cause of the abnormal state.

Further, in the local 5G monitoring system according to the present invention, the measuring device measures a state of Internet Protocol (IP) data communication in a wireless network of the local 5G system in addition to the radio waves, as the measurement data.

With this configuration, a heat map of the states of IP data communication is generated at predetermined time intervals, and the heat map at the time designated by the user is displayed. Therefore, since the heat map can be displayed retroactively, it is possible to easily specify the cause of the abnormal state.

Further, in the local 5G monitoring system according to the present invention, the server device displays a correlation between a state of the radio waves in time series and a state of the IP data communication in the measuring device.

With this configuration, the correlation between the state of radio waves and the states of IP data communication is displayed in time series. Therefore, it is possible to check the contradiction of the correlation between the state of the radio waves and the state of IP data communication in time series, so that it is possible to easily specify the cause of the abnormal state.

Further, in the local 5G monitoring system according to the present invention, the server device displays the states of the IP data communication corresponding to the states of the radio waves measured by all the measuring devices in order of the states of the radio waves.

With this configuration, the states of the IP data communication corresponding to the states of the radio waves measured by all the measuring devices are displayed in order of the radio wave state. Therefore, it is possible to check the contradiction of the correlation of the states of the IP data communication according to the states of the radio waves in the entire area, so that it is possible to easily specify the cause of the abnormal state.

Further, a state display method of the present invention is a state display method of a local 5G monitoring system that includes a measuring device that measures radio waves from a base station of a local 5G system, and monitors the local 5G system, the method including: a step of generating, based on measurement data measured by the measuring device at predetermined time intervals, a heat map showing a distribution of states of the measurement data with colors corresponding to the states of the measurement data at respective points on the same plane; and a step of displaying the heat map at a time designated by a user, from the generated heat map.

With this configuration, a heat map is generated at predetermined time intervals, and the heat map at the time designated by the user is displayed. Therefore, since the heat map can be displayed retroactively, it is possible to easily specify the cause of the abnormal state.

Further, in the state display method according to the present invention, the measuring device measures a state of Internet Protocol (IP) data communication in a wireless network of the local 5G system in addition to the radio waves, as the measurement data.

With this configuration, a heat map of the states of IP data communication is generated at predetermined time intervals, and the heat map at the time designated by the user is displayed. Therefore, since the heat map can be displayed retroactively, it is possible to easily specify the cause of the abnormal state.

Advantage of the Invention

The present invention can provide a local 5G monitoring system capable of checking the past state of a local 5G system and easily specifying the cause of an abnormal state.

BRIEF DESCRIPTION OF THE DRAWINGS

FIG. 2 is a conceptual diagram of an abnormal state detection method for the local 5G monitoring system according to the embodiment of the present invention.

BEST MODE FOR CARRYING OUT THE INVENTION

Hereinafter, a local 5G monitoring system according to an embodiment of the present invention will be described in detail with reference to the drawings.

Figure 1:
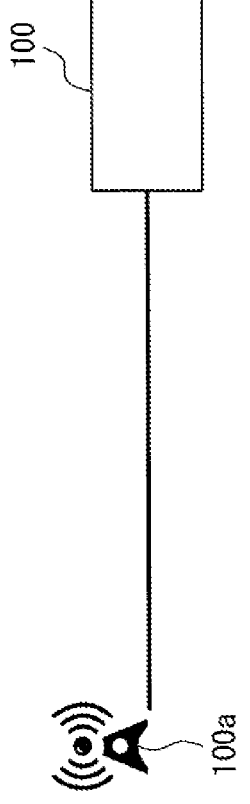
FIG. 1 is a schematic configuration diagram of a local 5G monitoring system according to an embodiment of the present invention.
Figure 1:
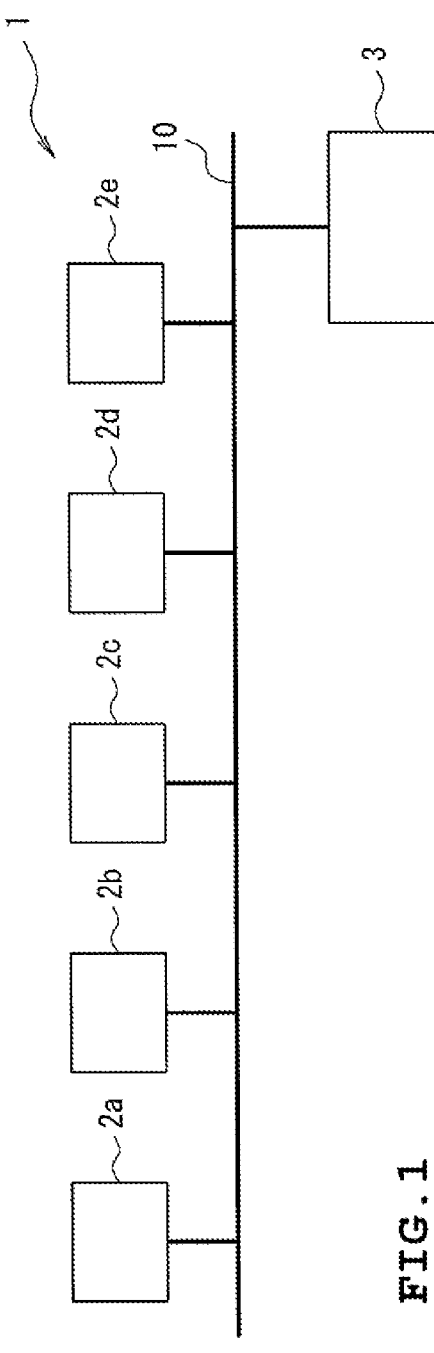

In FIG. 1, a local 5G monitoring system 1 according to an embodiment of the present invention is installed within the service area of a local 5G system 100.

The local 5G monitoring system 1 monitors the state of radio waves from the base station 100*a* of the local 5G system 100, the state of IP data communication in the wireless network of the local 5G system 100, and the like, and determines whether an abnormal state occurs.

The local 5G monitoring system 1 includes a plurality of measuring devices 2*a*, 2*b*, 2*c*, 2*d*, and 2*e* and a server device 3.

The measuring devices 2*a*, 2*b*, 2*c*, 2*d*, and 2*e* measure radio waves from the base station 100*a* of the local 5G system 100. The measuring devices 2*a*, 2*b*, 2*c*, 2*d*, and 2*e* measure IP data communication of the wireless network of the local 5G system 100. The measuring devices 2*a*, 2*b*, 2*c*, 2*d*, and 2*e* measure throughput, communication delay, or the like, as IP data communication measurements. As the measuring devices 2*a*, 2*b*, 2*c*, 2*d*, and 2*e*, wireless terminals such as smartphones and mobile terminals that support 5G communication may be used in addition to normal measuring devices.

The server device 3 is a computer device. The computer devices each include a central processing unit (CPU), a read only memory (ROM), a random access memory (RAM), a non-volatile storage medium such as a hard disk device, various input/output ports, a display device, and an input device such as a pointing device or a keyboard device, which are not shown.

A program for controlling the computer device is stored in the ROM and hard disk device of the computer device. That is, the computer device performs the control of the present embodiment, by the CPU executing the programs stored in the ROM and the hard disk device using the RAM as a work area.

The server device 3 and the measuring devices 2*a*, 2*b*, 2*c*, 2*d*, and 2*e* are connected by a LAN 10 such that data can be transmitted and received to and from each other via the LAN 10. The server device 3 and the measuring devices 2*a*, 2*b*, 2*c*, 2*d*, and 2*e* may be connected via the Internet.

The server device 3 is connected to the Internet, and can transmit and receive e-mails and access social networking service (SNS) via the Internet.

In the present embodiment, the server device 3 uses the measurement data measured by the measuring devices 2*a*, 2*b*, 2*c*, 2*d*, and 2*e* when the local 5G system 100 is installed, as reference information, and makes a notification in a case where the measurement data measured by the measuring devices 2*a*, 2*b*, 2*c*, 2*d*, and 2*e* during the operation of the local 5G system 100 exceeds a threshold from the reference information and deteriorate.

In the local 5G system 100, the required throughput, communication delay, or the like is designed, the base station 100*a*, or the like is installed while performing measurement by the measuring devices 2*a*, 2*b*, 2*c*, 2*d*, and 2*e* so as to satisfy the designed throughput and communication delay, and when it is checked that the designed throughput and communication delay are satisfied, the installation is completed.

For example, when registration of reference information is selected by an input to the input device, the server device 3 stores the measurement data obtained by the measuring devices 2*a*, 2*b*, 2*c*, 2*d*, and 2*e* at the time of the selection, as the reference information, in the hard disk device.

For example, as shown in FIG. 2, the server device 3 stores the measurement data measured by the measuring devices 2*a*, 2*b*, 2*c*, 2*d*, and 2*e* when the local 5G system 100 is installed, as reference information, in the reference information database. The reference information database is stored in the hard disk device of the server device 3, for example.

As the measurement data by the measuring devices 2*a*, 2*b*, 2*c*, 2*d*, and 2*e*, for example, as shown in FIG. 2, the state of radio waves (shown as "radio waves" in FIG. 2), throughput, delay, and the like are measured.

As the state of radio waves, for example, Reference Signal Received Power (RSRP), Reference Signal Received Quality (RSRQ), or the like are measured.

Throughput and delay are measured by communicating with, for example, the server device and the measuring devices provided in the local 5G system 100.

The measuring devices 2a, 2b, 2c, 2d, and 2e, for example, perform wireless communication with a server device provided in the local 5G system 100 via the base station 100a to measure throughput and delay.

For example, the measuring devices 2a, 2b, 2c, 2d, and 2e transmit an "echo request" packet of Internet Control Message Protocol (ICMP) to the server device, and measure the wireless network delay of the local 5G system 100 by using time until an "echo reply" is returned from the server device (Round-Trip Time).

For example, the server device 3 compares the measurement data from the measuring devices 2a, 2b, 2c, 2d, and 2e with the reference information at predetermined time intervals, and determines that an abnormal state occurs, when the measurement data exceeds a threshold from the reference information and deteriorates.

For example, the server device 3 determines that an abnormal state occurs, when at least one of the RSRP values measured by the measuring devices 2a, 2b, 2c, 2d, and 2e exceeds a threshold from the reference information and is reduced.

For example, the server device 3 determines that an abnormal state occurs, when at least one of the throughputs measured by the measuring devices 2a, 2b, 2c, 2d, and 2e exceeds a threshold from the reference information and is reduced.

For example, the server device 3 determines that an abnormal state occurs, when at least one of the network delays measured by the measuring devices 2a, 2b, 2c, 2d, and 2e exceeds a threshold from the reference information and increases.

In addition, it is determined that it is abnormal in a case where the measurement data of at least one of the measuring devices 2a, 2b, 2c, 2d, and 2e exceeds a threshold from the reference information and deteriorates, but it may be determined that it is abnormal in a case where the measurement data of a predetermined number of measuring devices 2a, 2b, 2c, 2d, and 2e exceeds a threshold from the reference information and deteriorates.

Further, the threshold may be changed depending on the installation positions of the measuring devices 2a, 2b, 2c, 2d, and 2e.

When detecting that an abnormal state has occurred, the server device 3 notifies a user of the detection.

The server device 3 notifies the user by, for example, warning display on a display device or the like, alarm sound by a buzzer or the like, transmission of an e-mail, posting on an SNS, or the like.

In the present embodiment, the server device 3 assigns a different color to each any graded stage of state of radio waves, based on the state of radio waves measured by the measuring devices 2a, 2b, 2c, 2d, and 2e, and generates and displays a heat map showing the distribution of the state of radio waves in a color corresponding to the state of radio waves at each point on the same plane.

Based on the location information on the measuring devices 2a, 2b, 2c, 2d, and 2e and the states of the measured radio wave, the server device 3 generates a heat map by estimating the states of radio waves in the points other than the installation locations of the measuring devices 2a, 2b, 2c, 2d, and 2e.

The server device 3 generates a heat map based on the measurement data measured by the measuring devices 2a, 2b, 2c, 2d, and 2e at predetermined time intervals.

Figure 3:
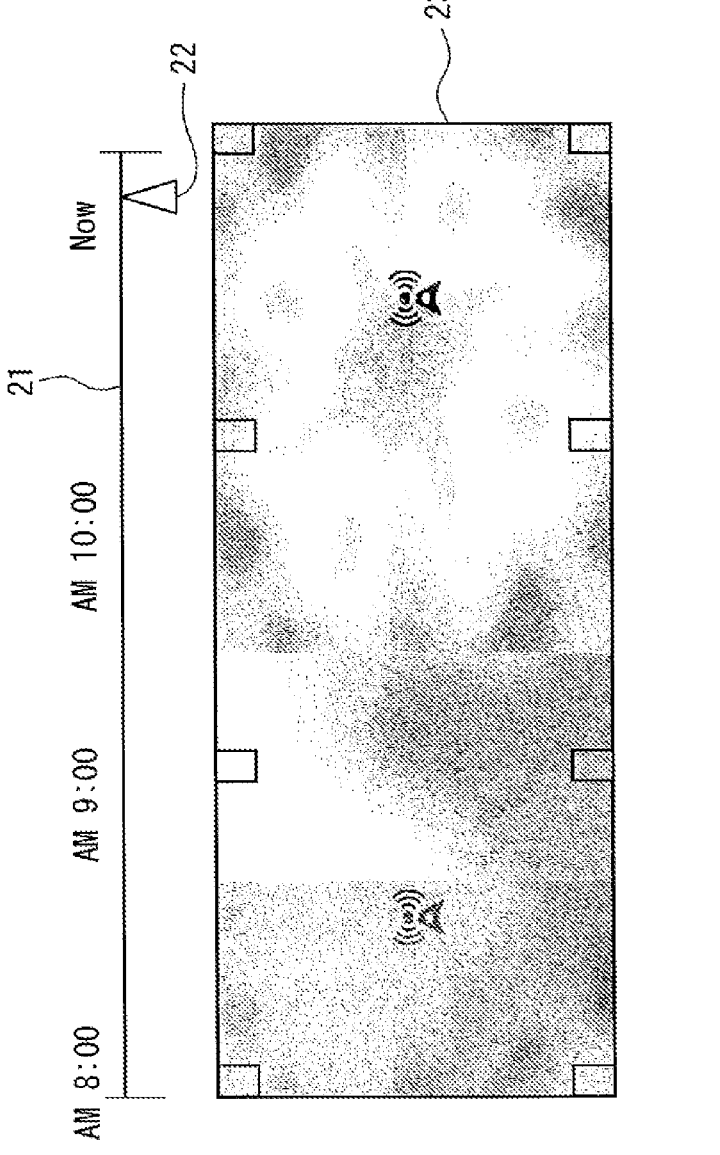
FIG. 3 is a diagram showing a display example of a heat map of the local 5G monitoring system according to the embodiment of the present invention.

The server device 3 displays a heat map as shown in FIG. 3, for example. In FIG. 3, the time bar 21 indicates the time from the oldest time when the heat map is generated to the current time.

The time marker 22 designates the time of the heat map displayed on the time bar 21.

The heat map display section 23 displays a heat map at the time designated by the time marker 22 on the time bar 21.

In this way, since the heat map can be displayed retroactively, it is possible to easily specify the cause of the abnormal state.

Note that the heat map may be generated and displayed not only for the state of radio waves but also for throughput and delay.

Figure 4:
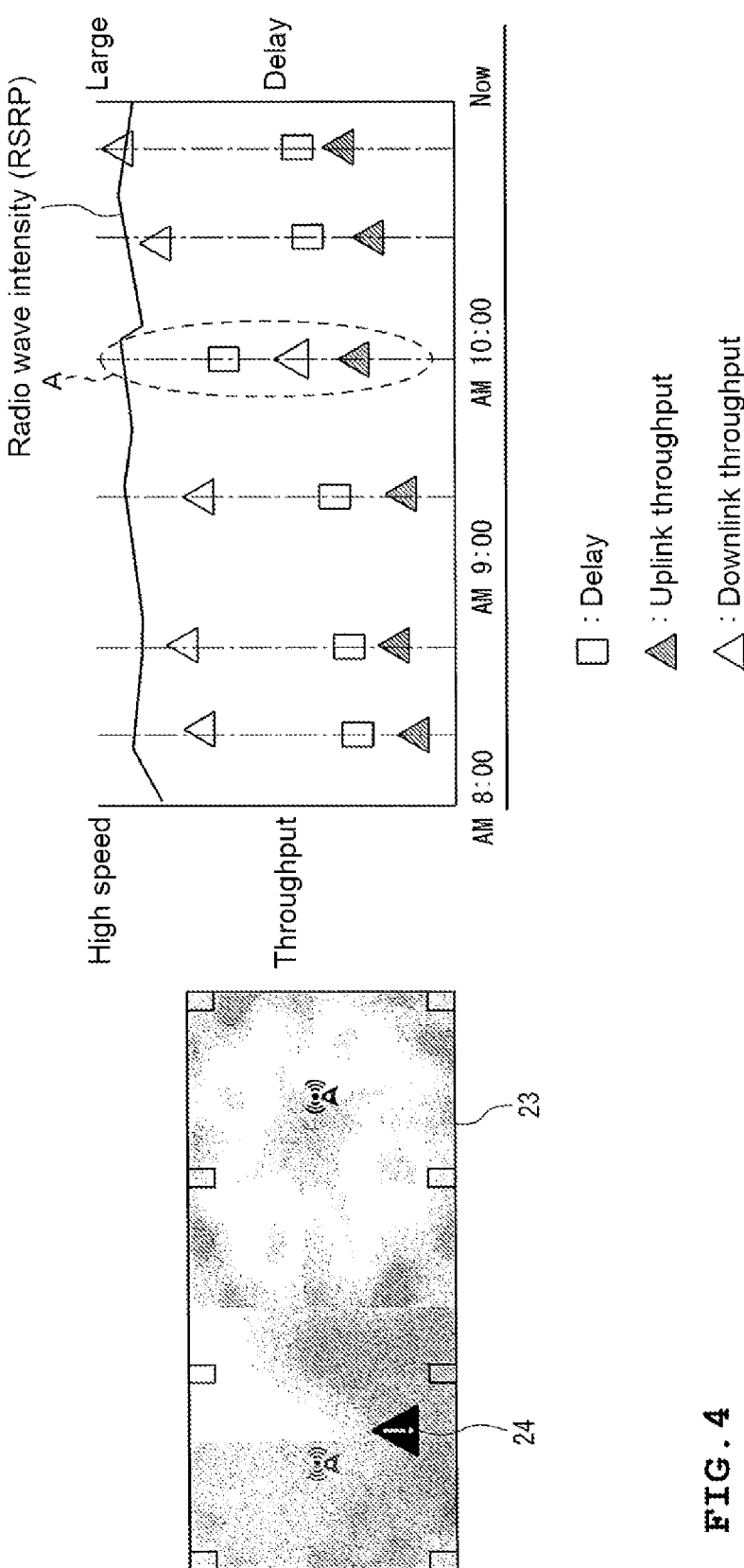
FIG. 4 is a diagram showing an example of displaying a heat map of a local 5G monitoring system according to an embodiment of the present invention together with a correlation between radio wave intensity, throughput, and delay in time series.

For example, as shown in FIG. 4, the server device 3 may display the heat map and the correlation between the radio wave intensity (RSRP) of the measuring devices 2a, 2b, 2c, 2d, and 2e, the throughput, and the delay in time series.

The server device 3, for example, as shown in A of FIG. 4, a warning mark 24 may be displayed on the heat map display section 23, in the installation locations of measuring devices 2a, 2b, 2c, 2d, and 2e that have a different correlation of downlink throughput, uplink throughput, and delay from at other times.

In this way, it is possible to check the contradiction of the correlation between the radio wave intensity, throughput, and delay in time series, so that it is possible to easily specify the cause of the abnormal state.

In addition, only the correlation between radio wave intensity, throughput, and delay in time series, in the measuring devices 2a, 2b, 2c, 2d, and 2e may be displayed.

Figure 5:
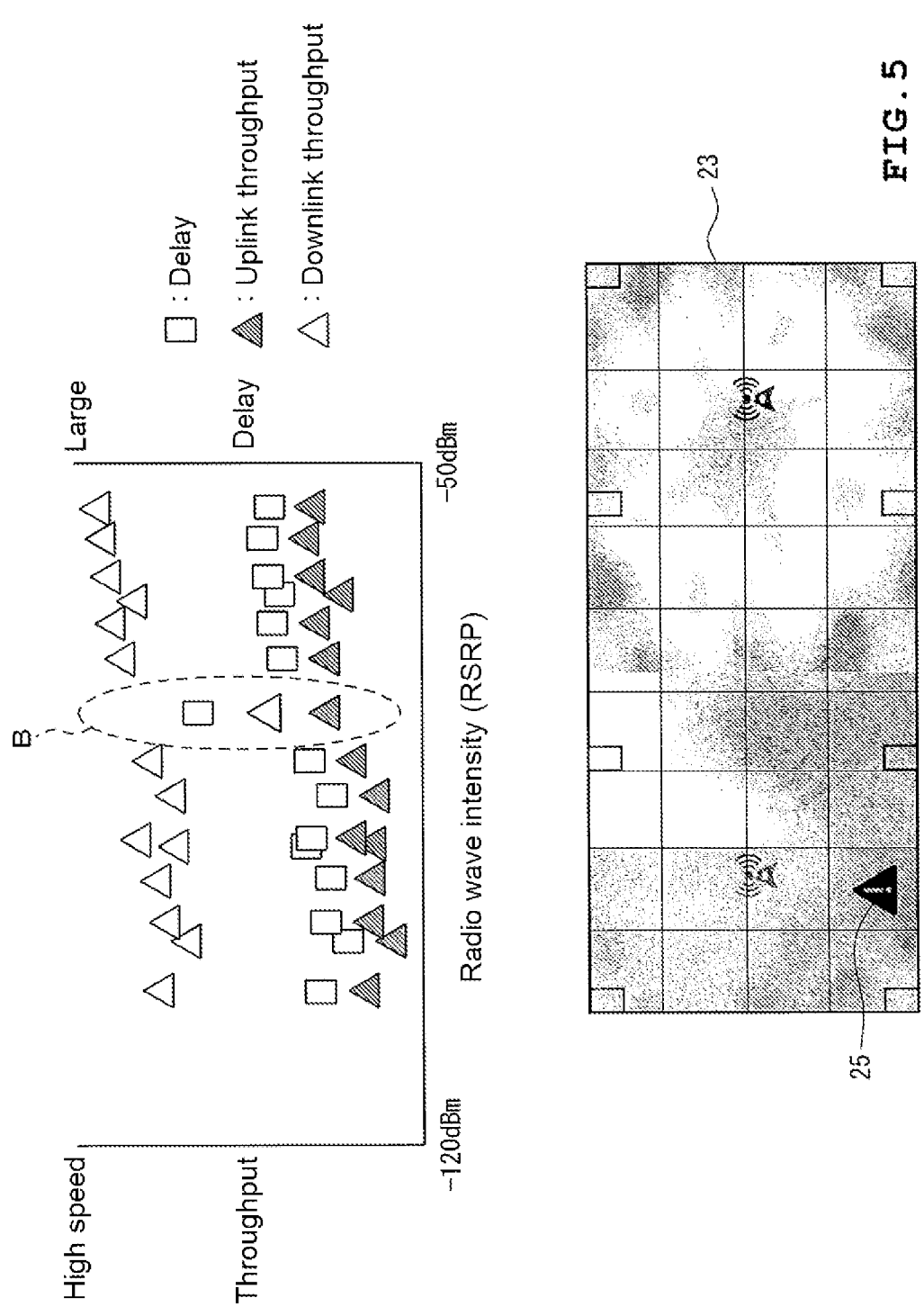
FIG. 5 is a diagram showing an example of displaying a heat map of a local 5G monitoring system according to an embodiment of the present invention together with a correlation between throughput and delay according to radio wave intensity in the entire area.

For example, as shown in FIG. 5, the server device 3 may display the heat map and the correlation between the throughput and delay according to the radio wave intensity of the measuring devices 2a, 2b, 2c, 2d, and 2e in the entire area.

The server device 3, for example, as shown in B of FIG. 5, a warning mark 25 may be displayed on the heat map display section 23, in the installation locations of the measuring devices 2a, 2b, 2c, 2d, and 2e that have a different correlation of downlink throughput, uplink throughput, and delay from other radio wave intensity measuring devices 2a, 2b, 2c, 2d, and 2e.

In this way, it is possible to check the contradiction of the correlation between the throughput and the delay according to the radio wave intensity in the entire area, so that it is possible to easily specify the cause of the abnormal state.

It should be noted that only the correlation between throughput and delay according to the radio wave intensity in the entire area may be displayed. Further, the correlation between the throughput and the delay according to the radio wave intensity in the entire area may be displayed in time series.

Although an embodiment of the present invention has been disclosed, it will be apparent that modifications may be made by those skilled in the art without departing from the scope of the present invention. All such modifications and equivalents are intended to be included in the following claims.

DESCRIPTION OF REFERENCE NUMERALS AND SIGNS

1: Local 5G monitoring system
2a, 2b, 2c, 2c, 2e: Measuring device

3: Server device
100: Local 5G system
100*a*: Base station

What is claimed is:

1. A local 5G monitoring system that monitors a local 5G system, comprising:

a plurality of measuring devices that measure radio waves from a base station of the local 5G system, the plurality of measuring devices comprising at least one wireless terminal that supports 5G communication and at least one dedicated measuring device; and a server device that belongs to the same local area network (LAN) as the plurality of measuring devices, or is connected to the Internet, and collects measurement data from the plurality of measuring devices, wherein the server device generates, based on the measurement data measured by the measuring device at predetermined time intervals, a heat map showing a distribution of states of the measurement data with colors corresponding to the states of the measurement data at respective points on the same plane, and displays the heat map at a time designated by a user, from the generated heat map, wherein the plurality of measuring devices measure a state of Internet Protocol (IP) data communication in a wireless network of the local 5G system in addition to the radio waves, as the measurement data, wherein the heat map shows a distribution of throughput and delay of the plurality measuring devices, wherein a correlation between the radio wave intensity (RSRP) of the plurality of measuring devices of an area, the throughput of the measurement data, and the delay of measurement data in time series is displayed alongside the heat map, and wherein the heat map comprises a warning mark at locations of measuring devices that have different correlation of a downlink throughput, an uplink throughput, and a delay of the measurement data between two points of time of the time series.

2. The local 5G monitoring system according to claim 1, wherein the server device displays a correlation between a state of the radio waves in time series and a state of the IP data communication in the plurality of measuring devices.

3. The local 5G monitoring system according to claim 1, wherein the server device displays the states of the IP data communication corresponding to the states of the radio waves measured by all the plurality of measuring devices in order of the states of the radio waves.

4. A state display method of a local 5G monitoring system that includes a plurality of measuring devices that measure radio waves from a base station of a local 5G system, and monitors the local 5G system, the plurality of measuring devices comprising at least one wireless terminal that supports 5G communication and at least one dedicated measuring device, the method comprising:

a step of generating, based on measurement data measured by the plurality of measuring devices at predetermined time intervals, a heat map showing a distribution of states of the measurement data with colors corresponding to the states of the measurement data at respective points on the same plane; and a step of displaying the heat map at a time designated by a user, from the generated heat map, wherein the plurality of measuring devices measures a state of Internet Protocol (IP) data communication in a wireless network of the local 5G system in addition to the radio waves, as the measurement data, wherein the heat map shows a distribution of throughput and delay of the plurality measuring devices, wherein a correlation between the radio wave intensity (RSRP) of the plurality of measuring devices of an area, the throughput of the measurement data, and the delay of measurement data in time series is displayed alongside the heat map, and wherein the heat map comprises a warning mark at locations of measuring devices that have different correlation of a downlink throughput, an uplink throughput, and a delay of the measurement data between two points of time of the time series.

* * * * *